United States Patent
Baig

(10) Patent No.: US 7,410,688 B2
(45) Date of Patent: Aug. 12, 2008

(54) LIGHTWEIGHT PANEL

(75) Inventor: Mirza A. Baig, Lindenhurst, IL (US)

(73) Assignee: USG Interiors, Inc., Chicago, IL (US)

( * ) Notice: Subject to any disclaimer, the term of this patent is extended or adjusted under 35 U.S.C. 154(b) by 422 days.

(21) Appl. No.: 11/210,581

(22) Filed: Aug. 24, 2005

(65) Prior Publication Data

US 2007/0054102 A1    Mar. 8, 2007

(51) Int. Cl.
*B32B 21/02* (2006.01)
(52) U.S. Cl. .............. 428/292.4; 428/292.7; 428/294.7; 428/312.4
(58) Field of Classification Search .............. 428/292.4, 428/292.7, 294.7, 312.4, 313.7; 106/780
See application file for complete search history.

(56) References Cited

U.S. PATENT DOCUMENTS

| | | | | | |
|---|---|---|---|---|---|
| 3,298,888 | A | * | 1/1967 | Page et al. | 156/347 |
| 4,548,676 | A | * | 10/1985 | Johnstone et al. | 162/135 |
| 4,959,272 | A | * | 9/1990 | Long | 428/537.7 |
| 5,071,511 | A | * | 12/1991 | Pittman | 162/145 |
| 5,320,677 | A | * | 6/1994 | Baig | 106/780 |
| 5,395,438 | A | * | 3/1995 | Baig et al. | 106/164.51 |
| 5,558,710 | A | * | 9/1996 | Baig | 106/780 |
| 5,614,307 | A | * | 3/1997 | Andersen et al. | 428/294.7 |
| 5,631,052 | A | * | 5/1997 | Andersen et al. | 428/34.5 |
| 5,911,818 | A | * | 6/1999 | Baig | 106/698 |
| 5,922,447 | A | * | 7/1999 | Baig | 428/292.7 |
| 5,964,934 | A | * | 10/1999 | Englert | 106/287.1 |
| 6,268,042 | B1 | * | 7/2001 | Baig | 428/211.1 |

* cited by examiner

*Primary Examiner*—N Edwards
(74) *Attorney, Agent, or Firm*—Pearne & Gordon LLP

(57) ABSTRACT

A composite board comprising a core and a paper facer sheet adhesively laminated to one face of the core, the core including a mixture of perlite, binder, and cellulose fiber, the core being formed as a water slurry with said perlite, binder and cellulose fiber being uniformly distributed therein, the perlite being in an expanded state such that its particles include internal voids and exhibit a density of about 5 to about 15 pounds per cubic foot and being present in sufficient quantity to occupy in bulk at least 50% of the volume of the core, on a weight basis, the perlite and cellulose fiber combined forming at least 25% of the weight of the core. The paper facer being laminated to the core with a water-based adhesive applied across substantially the full area of the facer, both the compressive strength of the perlite and tensile strength of the cellulose fiber being utilized by operation of the binder such that a relatively high nail-pull capacity in comparison to the weight of the composite board is achieved and sag resistance is imparted to the composite board when it is used for ceiling tile.

2 Claims, No Drawings

LIGHTWEIGHT PANEL

The invention relates to a composite board useful in constructing static structures and, in particular, walls, suspended ceilings, and the like.

PRIOR ART

Conventional wallboard, sometimes called drywall, is used extensively throughout the world, particularly in the construction of interior walls. The formulation of this product ordinarily includes a large proportion of gypsum that, consequently, is reflected in the weight of a board. Typically, conventional boards have a density of about 40 lbs. per cubic foot (pcf). Air may be entrained or trapped in the board composition to afford compressibility and to reduce weight. However, the gypsum content normally is maintained at a relatively high level so that adequate "nail pull" strength is assured. The weight of conventional wallboard is a significant disadvantage because it adds to shipping and handling costs in its distribution and labor costs including the effects of fatigue and/or strain, in its site delivery and installation.

Tile for suspended ceilings is produced with various formulations, calipers, face patterns, and coatings. A long standing and frequent problem with conventional ceiling tile is its tendency, after being installed, to sag, particularly in humid and/or high temperature environments resulting in an unsightly and, therefore, unsatisfactory condition. It has been noted that the inclusion of perlite in ceiling tile formulations can have a tendency to increase the susceptibility of tile to sag.

SUMMARY OF THE INVENTION

The invention provides a relatively lightweight composite board useful, inter alia, for wall construction and suspended ceiling tile. The invention combines the use of expanded perlite as a lightweight medium in the core of the board and paper as a high tensile material in a cladding for the core to produce a board that is surprisingly both light and strong. The formulation of a suitable board core contains, by way of example, on a weight basis, approximately 15% to 40% perlite, approximately 10% to 30% cellulose fiber, a binding agent such as starch of approximately 5% to 15%, approximately 0% to 50% mineral wool and approximately 0% to 25% of filler such as gypsum. Paper stock is laminated to at least one side of this board core to work as a tensile structural element.

It has been found that the expanded perlite, in the disclosed composite board, works like a structural foam so that despite its low density, a relatively high compressive strength is obtained. The high compressive strength, more specifically, can apparently be attributed to the structural integrity of the core where the expanded perlite, cellulose fiber, and binder function together as a structural foam. This compressive strength is reflected in a surprisingly high nail pull capacity enabling the product to be successfully used as wallboard. The performance of the board, with a core formulated as disclosed and clad with a laminated paper runs contrary to ordinary experience where the density of wallboard has heretofore out of necessity been maintained at a relatively high level to achieve an adequate nail pull value.

The lightweight board construction of the invention allows the board to be successfully used for ceiling tile applications. A paper layer laminated at the face or room side of the tile, in addition to providing a uniform base for finish painting or the like, serves to significantly enhance the sag resistance of the tile in an economically, environmentally positive manner.

DESCRIPTION OF THE PREFERRED EMBODIMENT

A composite board embodying the invention includes a planar core and at least one paper facer sheet laminated to one side of the core. The board, when intended to be used as wallboard can typically be manufactured in nominal 4'×8', 10', and 12' dimensions. The board can, of course, be manufactured in other sizes or can be cut to other sizes at the factory or in the field. Since the board is lighter in weight than conventional wallboard, it can be manufactured in a greater width that is standard, for example, 5 foot and still be manually handled. The core is manufactured by conventional water felting processes typically used in ceiling tile manufacture, for example. The formulation of the core can vary considerably, but the basic or primary constituents are perlite, cellulose fiber, and binder. These constituents and other optional constituents are uniformly mixed in a water slurry of about 5% solids, dewatered on a screen to form a mat, and then dried to form the core. To the extent practical, the constituents remain uniformly distributed in the core as it is completed. It is preferable that the mat thickness be controlled by appropriate pressing techniques, known in the art, with sufficient exactness to produce a core of specified thickness preferably without supplemental grinding or sanding operations.

A discussion of the primary constituents and some optional constituents follows:

Perlite

Expanded perlite can be visualized as popped popcorn. After expansion to a particular density, the perlite particles have included voids or holes. After mixing with the constituent materials in a water slurry, the perlite particles contain water which must be subsequently removed during drying of the core mat. While a high perlite content can produce good bulking of the core, increases in perlite content may reduce board forming speed because of increased water content and can lessen noise reduction and sag resistance in ceiling tile applications.

Cellulose Fiber

Cellulose fiber provides wet strength during formation of the core. Cellulose fiber encapsulates the perlite and other fine particle size materials such as starch and fillers during the mat formation. Without cellulose fiber in the core formulation, the perlite would float to the surface of the slurry and formation of the core would become difficult. Excessive amounts of cellulose fiber in ceiling tile applications adversely affect the cut-ability of the tile with a hand-held board knife, commonly used by installers to cut tiles. An economical source of suitable cellulose fiber is recycled paper, but other sources of such fiber, such as wood, are practical.

Binder

Starch and latex are binders that provide a cohesive bond between the primary core ingredients after the core is dried. Normally, uncooked starch is used in a typical core formulation. The uncooked starch does not provide any strength until it is cooked so that cellulose fiber is relied upon to provide green/wet strength before the core is dried. Once the starch is cooked, the core becomes crispy and can be cut easily with a hand-held board knife. Higher amounts of starch provide better crispiness. Increased organic content including starch and cellulose fiber has a negative impact on ceiling tile sag resistance under high humidity conditions.

Mineral Wool

Mineral wool in the core formulation of a board used for ceiling tile increases the sound absorption (NRC) of the board. In general, the higher the amount of mineral wool the better the sound absorption. Mineral wool also advantageously gives bulking to the slurry during formation of the core.

Fillers

Clay is important in fire-rated ceiling tile. During a fire, the clay can sinter and provide exceptional fire resistance to the ceiling tile. However, high clay content in the core formulation slows down the production line speed due to its affinity for water.

Calcium carbonate is a typical filler that has no significant value in the board properties except that it may give some hardness to the product but it can lower the cost of the product. Other commonly used low cost fillers are calcium sulfate and fly ash.

Gypsum, due to a limited solubility in water, acts as a flocculating vehicle. The function of flocculent in the core slurry is to retain and uniformly distribute the fine particles (inorganic clay, organic starch, etc.) in the mat during the processing (dewatering, vacuum and wet pressing). The lack of a flocculating vehicle in the formulation adversely affects the drainage because of migration of fine and high density particles to the bottom of the mat during the processing. Gypsum can produce a mat thickness higher than that produced by other inorganic fillers, clays and calcium carbonate. A higher mat thickness (loft) prior to wet pressing is beneficial in removing excess water. Gypsum can avoid the need for another flocculent, a coagulant and/or a surfactant. Gypsum can improve the hardness in the board. Gypsum can act as a dispersant to de-agglomerate mineral fiber and/or cellulose fiber and thereby permit higher slurry consistency (solids %) to increase the production rate. Gypsum does not significantly "spring-back" or swell after pressing and drying of the core mat so that the need to sand the core to control core thickness is reduced.

From the foregoing discussion of the primary and potential constituent materials it will be seen that the selection of materials and their proportions can depend on the intended use of the composite board and its requisite physical properties.

Of the main components, perlite, cellulose fiber and binder, perlite occupies the majority of the volume of the core. The density of the perlite is about 3 to about 15 pounds per cubic foot and, more preferably, between about 6 and about 10 pounds per cubic foot and, most preferably, about 8 pounds per cubic foot. Regardless of the actual density of the expanded perlite that is used in constructing the core, it is important on a bulk basis, the perlite occupies a majority of the volume of the core and, preferably, occupies substantially all of the volume of the core. One way of assuring that the core is adequate in its perlite content, is to slightly overcharge the mix in the slurry with perlite so that when the mat forming the core is pressed to a specified size, a limited amount of the perlite expanded particles, e.g. about 5% is crushed.

A paper facer is laminated to at least one side of the core. The paper facer can be any one of a variety of forms, such as kraft paper, depending on the ultimate use of the composite board. Where the composite board is intended to be used as wallboard, regular wallboard paper (i.e. paper on the face or rear of drywall) can be laminated to the core. An example of such paper has a thickness of between about 11 mills and about 13 mills. Such paper commonly will exhibit a tensile strength of about 140 pounds in the machine direction and 45 pounds in the cross direction when a sample size of 2 inches wide is clamped and pulled in a standard test fixture (TAPPI test standard). Also, where the composite board is intended to be used for wallboard, its overall caliper or thickness will be, for example, nominally ⅜", ½", ⅝", or ¾". The core is sized in thickness to make up this nominal thickness when combined with either a paper facer on only one side or a separate paper facer on each opposite side of the core. Typically, the paper facer or facers are laminated to the core simultaneously on the production line as the core is being made after being cut to size or before. The paper facer or facers are adhered to the core by a suitable commercially available water-based adhesive, preferably a latex. The adhesive may be sprayed, roll-coated or otherwise distributed across the full surface of one or both the core and paper facer by conventional known techniques. As the mat is dried and the core completed in factory production, it typically has a very low moisture content of about 2% or less. This low moisture content enables the water based adhesive to cure quickly when the paper facer or facers is/are laminated to the core in factory production of the composite board.

Ideally, the resultant composite board should have a density of about 30 pounds per cubic foot. This density or weight can afford significant benefits over standard wallboard weights. Savings in shipping, handling, and installation costs are potentially immense. The invention, by employing a lightweight core, departs from the conventional practice of maintaining at least a minimum density of about 40 pounds per cubic foot for gypsum-based wallboard. In current practice, when the density of conventional wallboard is reduced below this value, the strength of the wallboard suffers and typically nail-pull performance becomes unacceptable. Nail-pull is detailed in ASTM Standard C473 and is used by the industry to measure the performance of wallboard or panel construction with industry standards.

The invention involves the use of expanded perlite cells or particles in a homogeneous mix of cellulose (paper) fiber and binder. A practical form of binder is starch derived from, for example, corn, potato and/or wheat stock. The starch may be precooked before it is introduced into the slurry from which the mat of the core is formed. The cellulose fiber and binder form a matrix in the interstices between the perlite particles. The binder immobilizes the cellulose fibers relative to one another and the fibers relative to the perlite particles. The cellulose fibers contribute a major portion of the tensile strength of the core. Preferably, the combined weight of the perlite and cellulose fiber is at least 25% of the total weight of the core.

Composite boards made by the disclosed process and disclosed formulation exhibit a surprisingly high nail-pull performance, particularly when compared against standard gypsum-based wallboard and lightweight gypsum-based wallboard. As best understood, and depending in part on the actual formulation, it is theorized that the perlite component of the core mixture, combined with the stabilizing function of the paper fiber and binder enables the perlite grains to act collectively as a structural foam, yielding a high strength in compression while being relatively light in weight. The strength of the core, not only in compression, but also in tension, offers the unique ability of the composite board to be clad with only one paper facing and still provide high levels of nail-pull performance. That is to say, a second paper facer need not necessarily be used to obtain adequate nail pull strength where the face of the panel against which the head of a nail or screw is driven is the sole paper clad side.

In addition to the basic constituents of the core, as mentioned, other materials may be used in the core formulation. These additional materials can include mineral wool, gypsum and filler such as clay, fly ash, and dolomite. Below is a table showing potential components of a core mixture and potential relative percentages on the basis of weight. The core of the composite board has a formulation within the following parameters:

|  | Minimum | Maximum | Exemplar Formulation 1 |
|---|---|---|---|
| Perlite | 15 | 50 | 30 |
| Cellulose Fiber | 10 | 30 | 19 |
| Binder | 5 | 15 | 12 |
| Mineral Wool | 0 | 50 | 35 |
| Filler | 0 | 20 | 4 |
| TOTAL |  |  | 100 |

Composite boards having either one or two faces laminated with a standard wallboard paper and having the exemplar core formula set out in the foregoing table exhibited the following performance:

| Sample # | Paper Direction | Thickness in | Density pcf | MOR psi | Nail-pull-LB |
|---|---|---|---|---|---|
| Paper 1-side, 3/8" caliper core | | | | | |
| Avg. | FU, MD | 0.403 | 30.8 | 336 | 53 |
| Avg. | FD, MD | 0.404 | 31.0 | 700 | 50 |
| Avg. | FU, CD | 0.404 | 30.6 | 340 | 49 |
| Avg. | FD, CD | 0.404 | 30.3 | 420 | 50 |

| Sample # | Paper Direction | Thickness in | Density pcf | MOR psi | Nail-pull-LB |
|---|---|---|---|---|---|
| Paper 2-Side, 3/8" caliper core | | | | | |
| Avg. | FU, MD | 0.414 | 31.8 | 781 | 70 |
| Avg. | FD, MD | 0.416 | 31.8 | 799 | 75 |
| Avg. | FU, CD | 0.421 | 31.7 | 473 | 72 |
| Avg. | FD, CD | 0.420 | 31.8 | 473 | 73 |
| Paper 1-side, 1/2" caliper core | | | | | |
| Avg. | FU, MD | 0.520 | 29.8 | 437 | 79 |
| Avg. | FD, MD | 0.523 | 29.8 | 730 | 78 |
| Avg. | FU, CD | 0.518 | 30.3 | 364 | 79 |
| Avg. | FD, CD | 0.520 | 30.2 | 466 | 79 |
| Paper 2-Side, 1/2" caliper core | | | | | |
| Avg. | FU, MD | 0.534 | 30.3 | 784 | 88 |
| Avg. | FD, MD | 0.538 | 30.3 | 795 | 81 |
| Avg. | FU, CD | 0.538 | 30.3 | 500 | 84 |
| Avg. | FD, CD | 0.535 | 30.7 | 489 | 85 |

During the testing:
FU = Face Up,
FD = Face Down
MD = sample tested paper in Machine Direction
CD = sample tested paper in Machine Cross Direction MOR (modulus of rupture) is measured by using the ASTM D1037 testing procedure.

Based on the foregoing, one skilled in the art may formulate a 6,000 lb. solids water slurry batch to obtain the estimated results:

| | Formulations with different amounts of perlite and weight - 1/2" Board | | | | | | | |
|---|---|---|---|---|---|---|---|---|
| | 2 | | 3 | | 4 | | 5 | |
| | % | wt., LB | % | wt., LB | % | wt., LB | % | wt., LB |
| Wool % | 0 | 0 | 20 | 1200 | 5 | 300 | 23 | 1380 |
| Perlite % | 35 | 2100 | 15 | 900 | 50 | 3000 | 40 | 2400 |
| Fiber % | 30 | 1800 | 30 | 1800 | 20 | 1200 | 25 | 1500 |
| Starch % | 15 | 900 | 10 | 600 | 11 | 600 | 12 | 720 |
| Filler % | 20 | 1200 | 25 | 1500 | 14 | 840 | 0 | 0 |
| TOTAL | 100 | 6000 | 100 | 6000 | 100 | 6000 | 100 | 6000 |
| Nail-Pull LB | Estimated 110 | | Estimated 100 | | Estimated 95 | | Estimated 110 | |

As a general rule, the higher the amount of cellulose fiber, the lower the density of the board will be. As previously indicated, the low density boards of the invention can readily exceed industry nail pull standards for equivalent board thicknesses.

Industry standards establish accepted nail pull values of 56 lb. for 3/8" wallboard and 77 lb. for 1/2" wallboard. The foregoing table shows that the lightweight core of the exemplar formulation combined with standard drywall paper laminated on one or both sides can exceed these industry standards. It is evident from this data that the density of the core and/or the strength of the paper facer or facers can be reduced from the recorded lightweight construction while still achieving satisfactory nail pull performance was of at least the industry standards.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A composite board comprising as components, a core and paper facer sheet material adhesively laminated to at least one face of the core, the core including a substantially uniform mixture of perlite, binder and cellulose fiber, the core being formed as a water slurry, the perlite being in an expanded state such that its particles include internal voids and exhibit a density of about 3 to about 15 pounds per cubic foot, the perlite comprising between about 15% to about 40% of the weight of the core, the cellulose fiber comprising between about 10% to about 30% of the weight of the core, the binder comprising between about 5% to about 15% of the weight of the core, the cellulose fiber and binder forming a matrix in the interstices between the perlite particles, the binder adhering the cellulose fibers to one another and adhering the cellulose fibers to the perlite particles, the paper facer material being laminated to the core with a water based adhesive applied across substantially the full area of the facer material, the formulation of the perlite, cellulose fiber, binder and other constituents of the core and paper facer material being selected to produce a composite board density of about 30 pounds per cubic foot or less and a nail pull of at least about 56 pounds when the composite board caliper is nominally $3/8"$ and at least about 77 pounds when the composite board caliper is nominally $1/2"$.

2. A composite board as set forth in claim 1, wherein said paper facer sheet material is laminated on opposite sides of said core.

* * * * *